Oct. 18, 1955  A. H. MYLES  2,721,300
PROTECTIVE CONTROL SYSTEM FOR ELECTRIC MOTOR
Filed May 17, 1950

Inventor
Asa H. Myles
By John H. Leonard &
Harold J. Rathbun
his Attorneys

United States Patent Office 2,721,300
Patented Oct. 18, 1955

2,721,300

PROTECTIVE CONTROL SYSTEM FOR ELECTRIC MOTOR

Asa H. Myles, Solon, Ohio, assignor to The Electric Controller & Manufacturing Company, Cleveland, Ohio, a corporation of Ohio Application May 17, 1950, Serial No. 162,538

14 Claims. (Cl. 318—453)

This invention relates to improvements in alternating current control systems and more particularly to improvements in time-delay, undervoltage protection systems which permit automatic reclosure of an alternating current electromagnetic switch after it has been opened due to a momentary reduction in the voltage applied to the equipment controlled by the switch, and which prevent such automatic reclosure if the reduction in voltage persists longer than a predetermined time.

Many systems have been proposed and used for providing time-delay, undervoltage protection for alternating current loads. None of the known prior systems, however, is completely satisfactory either because complicated and specialized control equipment is required, the number of control stations that can be provided is limited, unnecessary shut downs are caused by small voltage dips, improper switching sequence occurs during some conditions, or the load cannot be deenergized by momentary depression of a stop push button. Furthermore, in all of the known prior systems, the contacts of the main switch are apt to weld together because, when the voltage declines gradually, the main switch hesitates in an intermediate position before it opens completely.

For economy both in manufacture and maintenance, a time-delay undervoltage protection system should not require any special apparatus designed particularly for that purpose but instead should use only equipment of conventional, standardized, and simplified design. For example, a control station of the system preferably should comprise only a conventional momentary type "stop" or "start" push button, or both. It is desirable that the system be so arranged that an unlimited number of control stations can be provided each requiring only a few control wires. For adequate safety, a momentary depression of any one of the stop push buttons should cause immediate opening of the main switch in order to disconnect the load from the supply source without delay. If small reductions in voltage do not adversely affect the operation of the electrical apparatus being controlled, the control system should prevent disconnection of the controlled apparatus during small voltage reductions while insuring its disconnection upon voltage reductions below a minimum safe value. Furthermore, a completely satisfactory time-delay, undervoltage protection system should provide for quick and unhesitating opening of the main switch when the supply voltage falls to a value only slightly below the voltage value at which that switch is supposed to drop-out as well as when the supply voltage declines gradually through the drop-out voltage range. In addition, for complete reliability the operating characteristics of the main switch and its control relays must be and remain so coordinated that the switch and relays operate in a predetermined sequence under all normal and abnormal conditions.

A general object of the present invention is to provide a time-delay, undervoltage protection system having all of the foregoing advantages and desirable operating features.

A principal object is to provide a time-delay, undervoltage protection system including an electromagnetic main switch or contactor which opens without hesitation to its fully open position consequent upon either a sudden or gradual decrease in the supply voltage to a value within a range but slightly below the drop-out value or consequent upon a gradual decrease in the supply voltage to a value below said range.

A further object is to provide a time-delay, under-voltage protection system in which a capacitor renders a holding circuit for the operating winding of the main switch capacitively reactive.

Another object is to provide a time-delay, undervoltage protection system in which the operation of the main switch and a control relay therefor in a positively predetermined coordinated relationship is assured under all conditions.

Another object is to provide a time-delay, undervoltage protection system in which a single capacitor renders a holding circuit for the respective operating windings of the main switch and a control relay or relays capacitively reactive.

A detailed object is to coordinate the operation of two alternating current electromagnetic devices by means of a capacitor connected in the energizing circuit therefor.

A more detailed object is to provide a time-delay, undervoltage protection system in which the holding circuit for the main switch and a control relay includes a capacitor connected in parallel with normally-closed contacts of the control relay, the capacitor and normally-closed contacts being connected in series with the contacts of a time delay relay.

The time-delay, undervoltage protection system of the present invention comprises an electromagnetic main switch or contactor controlled by series-connected "start" and "stop" push buttons. The start push button is of the momentary contact type and is by-passed after closure of the contactor by a holding circuit including normally-open contacts of a time delay relay which are delayed in opening, instantaneously operating normally-open contacts operated by, or controlled by, the contactor to open and close with the contactor, and a capacitor, all connected in series with each other. The capacitor and the instantaneous normally-open contacts of the holding circuit are in parallel with instantaneously operating normally-closed contacts of a control relay which, when closed, complete a reclosing circuit for the contactor through the contacts of the time delay relay. The control relay is initially energized through the start push button and the normally-open contacts operated by, or controlled by, the contactor, and is normally held in energized position through the capacitor and the contacts of the time-delay relay. The time-delay relay is initially energized through the start push button and contacts of the control relay and is also maintained energized through the holding circuit. The capacitive reactance of the capacitor is approximately twice the resultant inductive reactance of the operating windings of the contactor, the control relay, and the time delay relay when connected in parallel. The inductive reactance of the operating winding of the contactor is preferably very much less than the inductive reactance of the operating windings of the relays, and consequently the capacitive reactance of the capacitor is approximately twice the inductive reactance of the contactor operating winding. The contactor and the control relay are so interlocked electrically and their operating characteristics are so correlated that, upon a reduction of the supply voltage, the control relay always drops out without hesitation immediately after the contactor, whereas, upon a prompt resumption or increase of voltage after the contactor and control relay have dropped out, the control relay always picks up without hesitation immediately after the contactor. This coordinated operation is assured regardless of whether the voltage decreases or increases suddenly or gradually or fluctuates so long as it decreases to a value within the preselected operating range. The fact that the holding circuit for the contactor and control relays is capacitively reactive not only causes the contactor to open without hesitation when the voltage reaches a predetermined low value, but also assures the foregoing coordinated operation and permits the contactor to remain closed until and unless the supply voltage reaches a relatively low predetermined value.

Many prior time-delay undervoltage protection systems have operated satisfactorily for a considerable time and then have failed because of an unusual abnormal voltage condition. Accordingly, since such systems are for safety those in accordance with the present invention have been given extensive tests in the field so as to assure that they have been subjected to all probable fortuitous swings of voltage and various electric circuit abnormalties, many of which are not observable and some of which occur only infrequently with very long intervals therebetween.

The unusually satisfactory results of these tests appear to be due to the unhesitating drop-out of the contactor and to the positive coordination in operation between the contactor and its control relay.

The use of a capacitor in the holding circuit for a single electromagnetic device is claimed and the effect of the capacitor on the drop-out characteristics of the device is fully described in Ward L. Smith Patent No. 2,386,149 which issued on October 2, 1945. It has been found, however, that when a capacitor is used in a common holding circuit for two or more electromagnetic devices, the advantages thereof in the above patent are retained for each electromagnetic device and furthermore the operation of the electromagnetic devices is coordinated thereby.

Other objects and advantages will become apparent from the following description wherein reference is made to the drawings, in which.

Figure 1:
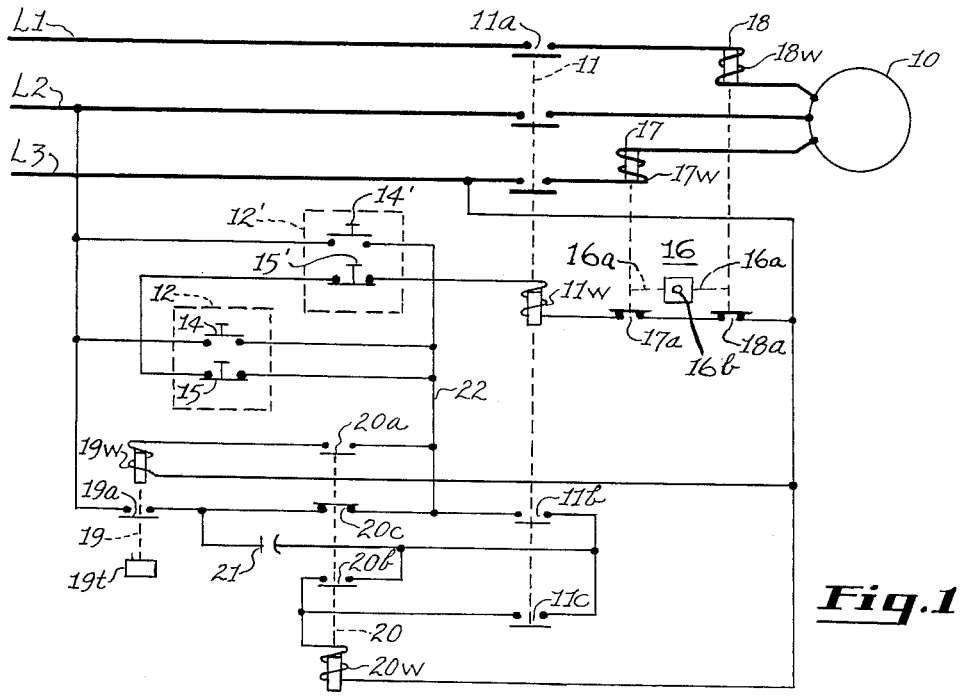
Fig. 1 is a wiring diagram of a preferred embodiment of the invention as applied to the control of an alternating current motor.

Referring to Fig. 1, an alternating current load such as alternating current motor 10 is arranged to be connected to a suitable source of power, indicated by supply lines L1, L2, and L3, by normally-open main or power circuit contacts 11a of an electromagnetic main switch or contactor 11 having an operating winding 11w and normally-open auxiliary or control circuit contacts 11b and 11c. The contactor 11 is preferably of the usual electromagnetic type and its winding 11w has a much smaller reactive when the contactor is open than when the contactor is closed. An example of a suitable magnetic circuit and contact arrangement for the contactor 11 is shown in the Smith patent hereinbefore identified. The contactor in the patent has a clapper-type armature biased to open position by gravity and carrying a movable contact arm assembly including a contact spring which is compressed when the armature is closed and which, during the initial portion of the opening movement of the armature, assists the force of gravity, subsequent movement of the armature to its fully open position being due to gravity alone. The winding 11w is supplied from the same source as the motor 10 so as to be subjected to the same voltage fluctuations as the motor.

Operation of the contactor 11 may be manually controlled from any one of a plurality of control stations 12 and 12' preferably including respective momentary contact type normally-open "start" push buttons 14 and 14' connected in parallel with each other and respective normally-closed "stop" push buttons 15 and 15' connected in series with each other.

An overload responsive device 16 for the motor 10 is shown as a pair of electromagnetic overload relays 17 and 18 having respective operating windings 17w and 18w interposed in the supply lines L1 and L3, respectively, and having respective normally-closed contacts 17a and 18a in series with each other and the winding 11w. Other suitable types of overload responsive devices may be used if desired. Preferably, the device 16 is provided with suitable latching means 16a, to prevent automatic resetting of the relays 17 and 18 after an overload or short circuit. The latching means 16a may be any of the well known types and is releasable manually or magnetically by a suitable push button 16b.

An electromagnetic time delay relay 19 having an operating winding 19w and normally-open contacts 19a is provided with any suitable means, such as dash-pot 19t, to delay for a few seconds the opening of the contacts 19a after deenergization of the winding 19w. If desired, the relay 19 may be a conventional displacement type of time-delay mercury switch using a magnetic plunger.

An energizing circuit for the winding 19w is controlled by normally-open contacts 20a of an electromagnetic control relay 20 having an operating winding 20w, additional normally-open contacts 20b, and normally-closed contacts 20c.

The contacts 19a, a suitable capacitive reactance device such as a capacitor 21, and the contacts 11b are connected in series with each other to define a holding circuit for the contactor 11 and the relays 19 and 20 around or in parallel with the push buttons 14 and 14' from the supply line L2 to a conductor 22. The contacts 19a are also in series with the contacts 20c to define a reclosing circuit for the contactor 11 from the supply line L2 to the conductor 22 around the push buttons 14 and 14', the contacts 20c being in parallel with the series connected capacitor 21 and the contacts 11b. The control relay 20 is controlled by the contacts 11b and 11c and is held closed under some conditions after opening of the contactor 11 through its own contacts 20b which are in parallel with the contacts 11c.

In the operation of the embodiment of Fig. 1, closure of one of the start push buttons 14 or 14' connects the operating winding 11w of the contactor 11 directly across the supply lines L2 and L3 from the supply line L2 through the closed one of the push buttons 14 or 14' to the conductor 22 and from the conductor 22 through the normally-closed stop push buttons 15 and 15', the winding 11w, and the contacts 17a and 18a of the overload responsive device 16 to the supply line L3. If approximately normal voltage exists at the supply lines L2 and L3, the winding 11w becomes operatively energized and the contactor 11 closes its contacts 11a, 11b, 11c. The contacts 11a when closed connect the motor 10 to the supply lines L1, L2, and L3 and the motor starts to accelerate. Closure of the contacts 11b and 11c connects the operating winding 20w of the relay 20 directly across the supply lines L2 and L3 in a circuit from the now energized conductor 22 through the contacts 11b and 11c and the winding 20w to the supply conductor L3. Closure of the contacts 11b also partially completes the holding circuit for the winding 11w.

The control relay 20 upon energization of its operating winding 20w closes its contacts 20a and 20b and opens its contacts 20c. Closure of the contacts 20b completes a holding circuit for the winding 20w around the contacts 11c, and opening of the contacts 20c prevents completion of the reclosing circuit for the contactor 11 upon subsequent closure of the contacts 19a. Closure of the contacts 20a completes an energizing circuit for the operating winding 19w of the time delay relay 19 from the now energized conductor 22 through the contacts 20a and the winding 19w to the supply conductor L3.

The time delay relay 19 in response to energization of its winding 19w closes its contacts 19a immediately. Closure of the contacts 19a completes the holding circuit for the contactor 11 and the relays 19 and 20 around the push buttons 14 and 14' from the supply conductor L2 through the contacts 19a, the capacitor 21, and the contacts 11b thereby to maintain the conductor 22 energized after the closed one of the push buttons 14 and 14' is opened. The foregoing sequence of closure of the contactor 11 and relays 19 and 20 takes place in a very short interval and then the closed push button 14 or 14' may be opened and the contactor and relays remain closed.

In accordance with the illustrative examples of this invention, the capacitor 21 is in the holding circuit for the parallel connected operating windings 11w, 19w, and 20w, and its capacitive reactance is so much in excess of the combined inductive reactance of the parallel connected windings that the voltage across the several windings remains approximately the same before and after the closed one of the push buttons 14 or 14' is opened.

Depression and consequent opening of either one or both of the stop push buttons 15 and 15' interrupts the connection between the conductor 22 and the winding 11w and the contactor 11 opens its contacts 11a instantly to disconnect the motor 10 from the supply lines L1, L2, and L3. The contacts 11b also open and disconnect the conductor 22 from the supply line L2 and the winding 19w of the time delay relay 19 is de-energized. The contacts 19a, however, remain closed for a time interval due to the dash-pot 19t. During this interval, the winding 20w of the relay 20 remains energized through the contacts 19a, the capacitor 21, and the contacts 20b and consequently the contacts 20c remain open. Reclosure of the open stop buttons 15 or 15' after the contactor 11 opens and during the time delay interval of the relay 19 does not cause reenergization of the winding 11w since the conductor 22 remains deenergized because its connection to the supply line L2 is interrupted at the contacts 20c and at the contacts 11b. After a short time delay, preferably of about 2 to 5 seconds, the contacts 19a open to deenergize the relay 20. The resulting closure of the contacts 20c now is of no effect because the contacts 19a are open. Consequently, only a momentary depression of one of the stop push buttons 15 or 15' disconnects the motor 10 from the source and prevents reconnection thereof until one of the start push buttons 14 or 14' is closed.

In event of an overload condition in the motor 10 or its supply circuit, one, or both, of the overload relays 17 and 18 responds to open the contacts 17a or 18a, or both. This has the same effect as a momentary depression of one of the stop buttons 15 and 15' and the subsequent operating sequence is as explained hereinbefore. Immediate reclosure of the contacts 17a and 18a after they have opened because of an overload unaccompanied by a voltage reduction does not cause automatic reclosure of the contactor 11 because the contacts 20c remain open until the contacts 19a open and the conductor 22 is deenergized and remains deenergized until one of the start push buttons 14 and 14' is operated. In event the overload relays 17a and 18a are to respond to short-circuit conditions which might cause a reduction in the supply voltage sufficient to cause drop-out of the relay 20, they should be provided with suitable means, such as the latching means 16a, to prevent immediate reclosure of the contacts 17a and 18a. Before an operator can operate the push button 16b to release the latching means 16a, the contacts 19a open, and one or the other of the push buttons 14 and 14' must be closed to restart the motor. Thus the latching means 16a prevents repeated closure of the contactor 11 on a fault.

Figure 3:
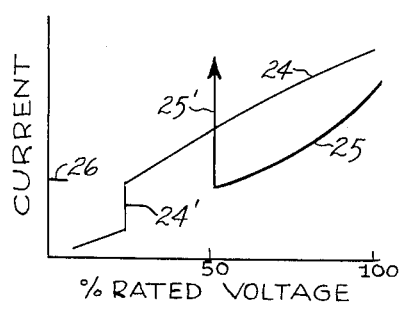
Figs. 3 and 4 are graphs to assist in understanding the invention.

Assume now that the contactor 11 and the relays 19 and 20 are in their operated positions and that the supply voltage at the conductors L1, L2, L3 declines gradually through the range of the voltage value which permits contactor 11 to drop out. Because the circuit through the winding 11w is capacitively reactive, the current therein decreases upon a gradual decline in supply voltage as indicated by the curve 24 of Fig. 3 wherein the current in the winding 11w is plotted against the percentage of rated voltage between the supply lines L2 and L3. If the capacitor 21 were not present, the current in the winding 11w would vary as indicated by the curve 25 of Fig. 3. Because of the capacitor 21, the supply voltage can decline to a relatively low percentage of its rated value before the contactor 11 starts to open, whereas, if the capacitor 21 were not included, the contactor 11 would start to open when the supply voltage reached a relatively much higher percentage of its rated value. The drop-out current value of the contactor 11 is indicated at 26 in Fig. 3. When the contactor 11 starts to open, that is, at the instant its armature breaks seal, the reactance of its winding 11w suddenly decreases. If no capacitor were used, the current in the winding 11w would suddenly increase as indicated at 25' due to the decrease in reactance of the winding 11w, and the contactor 11 would hesitate during opening until the declining voltage had reached a much lower value. The tendency to hesitate is aggravated by the reduction in contact spring pressure which occurs during the opening cycle as explained in the Smith patent hereinbefore identified. The reactance of the winding 11w is sufficiently less than that of the windings 19w and 20w and the capacitive reactance of the capacitor 21 is sufficiently in excess of the combined inductive reactance of the windings 11w, 19w, and 20w, that the sudden decrease in the reactance of the winding 11w as the contactor 11 starts to open is sufficient to cause a sudden decrease in the effective inductive reactance of the three parallel connected windings and a consequent increase in the total reactance of the circuit. Therefore, the current in the winding 11w decreases suddenly as indicated at 24' and the contactor 11 opens quickly without hesitation regardless of the rate of supply voltage decrease.

Figure 4:
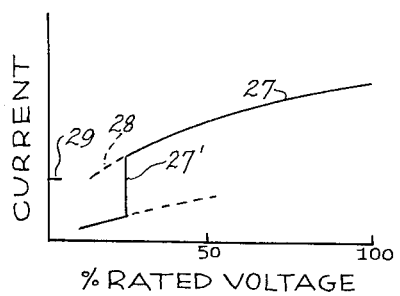

When the contactor 11 opens as a result of a failure of reduction in the supply voltage, it is essential that the relay 20 open without delay in order to complete quickly the reclosing circuit through the contacts 20c. Since completion of the reclosing circuit by closure of the contacts 20c by-passes the capacitor 21, it is also essential if unhesitating drop-out of the contactor is to be obtained that the reclosing circuit not be completed until the contactor 11 has fully opened. Therefore, the contactor 11 must under all conditions completely open before the contacts 20c close and the contacts 20c must close immediately after the contactor 11 opens. This desirable sequence is assured in accordance with the present invention because of the effect of the capacitive reactance of the capacitor 21. The current in the winding 20w varies as indicated by the curve 27 in Fig. 4 during a decline in the supply voltage. As shown by comparing the curve 27 with the curve 24 of Fig. 3, the current in the winding 20w declines slowly until the contactor 11 starts to open and then decreases suddenly as indicated at 27'. This is because as soon as the armature of the contactor 11 breaks seal, the reactance of the winding 11w suddenly decreases. Since the reactance of the winding 11w is very much less than that of the windings 19w and 20w, the effective inductive reactance of the parallel connected windings 11w, 19w, and 20w is consequently reduced upon opening of the contactor 11 and, because the capacitive reactance of the capacitor 21 is greater than the effective inductive reactance, the voltage across the winding 20w suddenly decreases. This results in a sudden decrease in the current in the winding 20w as indicated at 27' in Fig. 4. If the contactor 11 had not opened, the current in the winding 20w would have continued to decrease as indicated by the broken line 28 until the drop-out current value indicated at 29 were reached. A similar current change occurs in the winding 19w as the contactor 11 opens, and its armature starts to open when the relay 20 opens.

It is apparent, therefore, that a circuit has been provided for two alternating current electromagnetic devices supplied from the same source which insures that, under conditions of declining voltage of the source, a preselected one of the two always opens first and, when it opens, opening of the other must follow immediately even though the supply voltage does not continue to decline or even if it should start to increase. For operation in connection with the system shown by way of illustration, the windings of the two devices must be connected in parallel and the parallel circuit in series with the capacitor. Though not adapted for the illustrative system, the operating relation between the devices can be maintained by connecting the windings in series with each other and with the capacitor.

Should the reduction in the supply voltage be accompanied by a corresponding reduction in the frequency, the contactor 11 also opens without hesitation and the proper operating sequence is maintained. This is because upon a reduction in frequency the inductive reactance decreases and the capacitive reactance increases. Therefore, the two reactances are maintained in a relation in which the capacitive reactance is always the larger.

Opening of the rely 20 causes opening of the contacts 20a which interrupt the circuit to the winding 19w. The contacts 19, however, remain closed for a predetermined short interval. Opening of the contacts 20b prevents re-energization of the winding 20w until the contacts 11b and 11c reclose, and closure of the contacts 20c completes the reclosing circuit for the contactor 11.

If, after a decrease or failure of the supply voltage has caused opening of the contactor 11 and the relay 20, the supply voltage should return approximately to its normal value before the contacts 19a open, the winding 11w is operatively energized through the reclosing circuit from the supply line L2 through the contacts 19a, 20c, the conductor 22, the push buttons 15 and 15', the winding 11w, and the contacts 17a and 18a to the supply line L3. The contacts 11a thereupon reclose to energize the motor and the contacts 11b and 11c reclose to recomplete the energizing circuit for the winding 20w. Upon a return of the supply voltage after a decrease or failure of short duration, it is essential that the relay 20 does not pick up until the contactor 11 has fully closed since the energizing circuit for the winding 11w is through the contacts 20c. This result is accomplished by isolating the winding 20w until the contacts 11b and 11c close. The relay 20 starts to pick up as soon as the contacts 11b and 11c close, the circuit to the winding 20w being through the contacts 20c. Ordinarily a relay receiving energizing current through its own normally-closed contacts chatters and fails to close since the energizing current is interrupted when the normally closed contacts start to open. This is prevented in the present instance, however, by making the pick-up voltage of the relay 20 less than that of the contactor 11. Opening of the contacts 20c inserts the capacitor 21 into the energizing circuit for the windings 11w and 29w and, since the magnetic circuit of the contactor 11 is now closed, the relation between the inductive reactances and the capacitive reactance is such that the voltage across the winding 20w increases suddenly when the contacts 20c open, and the relay 20 consequently closes without hesitation. Relay 20 therefore closes positively immediately after the contactor 11 closes.

If the voltage decrease or failure exists for longer than the time delay setting of the relay 19, the contacts 19a open to interrupt the reclosing circuit. The contactor 11 can be reclosed after the contacts 19a open only by reclosure of one of the push buttons 14 or 14'.

Although operation of the system has been described under the assumption that the supply voltage declined gradually through the range of the drop-out voltage value of the contactor 11, similar operation occurs should the supply voltage decrease suddenly to a value just below the drop-out voltage value of the contactor 11 or to any lesser value.

The minimum voltage of the supply source which causes drop-out of the contactor 11 can be varied over a wide range as pointed out in the Smith patent and can be much lower than if the capacitor were not used. Hence, the present system permits the contactor 11 to remain closed through many small voltage dips which in prior systems would cause drop-out of the contactor.

Figure 2:
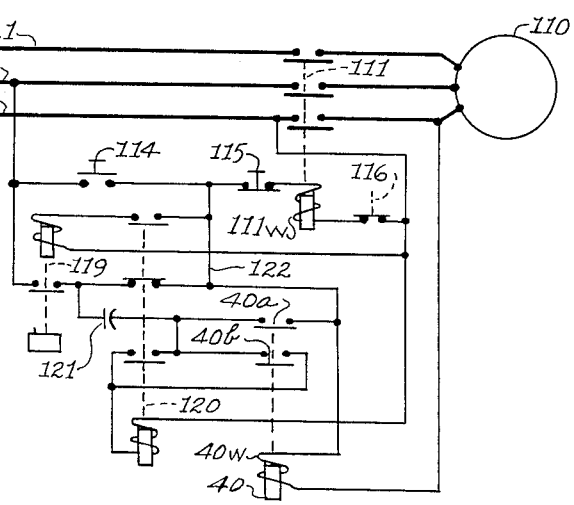
Fig. 2 is a wiring diagram of a modification.

Many standard contactors for starting alternating current motors cannot conveniently be equipped with auxiliary contacts such as the contacts 11b and 11c of Fig. 1. In such case the modified circuit of Fig. 2 can be used wherein similar parts are referred to by the same reference characters as in Fig. 1 except for the addition of one hundred thereto. The function of the auxiliary contacts on the contactor 111 is accomplished in Fig. 2 by normally-open contacts 40a and 40b of a control relay 40 having an operating winding 40w. The winding 40w is connected between a conductor 122 and the terminal of the motor 110 which is connected to the supply line L3 when the contacts 111a are closed. The relay 40 thus has its winding 40w connected in parallel with the winding 11w and is controlled by the contacts 111a. Consequently, the relay 40 closes and opens with the contactor 111 and its contacts 40a and 40b function like the contacts 11b and 11c, respectively, of Fig. 1.

Having thus described my invention, I claim:

1. A time-delay undervoltage control system for a load supplied from a source of alternating current and comprising a normally-open electromagnetic main switch for connecting and disconnecting the load to and from the source and having a winding operative to close said main switch when energized and to permit opening of said main switch when deenergized, normally-open start contacts operative when closed to connect said winding for energization from said source, a holding circuit for said winding in parallel with said start contacts and including a capacitor connected in series with control contacts arranged to open and close with said main switch, the capacitive reactance of said capacitor being sufficiently greater than the inductive reactance of said winding that when said winding is supplied through said holding circuit the current in the winding decreases as the impedance of the winding changes when said main switch starts to open, a reclosing circuit for said winding in parallel with said series connected capacitor and control contacts, reclosing control contacts in said reclosing circuit normally maintained in open position, and means for closing said reclosing control contacts upon failure of voltage of the source to complete said reclosing circuit and for interrupting said reclosing circuit in a predetermined time after it has been completed provided the voltage does not return to normal during said predetermined time.

2. In a time delay undervoltage control system for a load supplied from an alternating current supply circuit, an electric motor, a normally open electromagnetic main switch for connecting the motor to the supply circuit, a winding for closing said main switch when energized, a main energizing circuit for said winding including a normally open start switch and a normally closed stop switch, in series, a holding circuit for said winding in shunt to said start switch and in series with said stop switch and including a capacitor and an auxiliary switch connected in series, the capacitive reactance of said capacitor being sufficiently in excess of the inductive reactance of the holding circuit when said main switch is closed that upon opening of said main switch the reactance of said holding circuit increases, the auxiliary switch being controlled by said winding to open and close with the main switch, a reclosing circuit for said magnet in shunt to the series connected capacitor and said auxiliary switch and in shunt with the start switch and in series with the stop switch, a relay adapted to close said reclosing circuit upon failure of voltage in the supply circuit, and means for opening said reclosing circuit in a predetermined time after it has been closed by said relay, provided the voltage does not return to normal during said predetermined time.

3. The combination with an alternating current supply circuit, an electric motor, a normally open electromagnetic main switch for connecting the motor to the supply circuit, an inductively reactive winding for closing said switch, a main energizing circuit for said winding including a normally open start switch and a normally closed stop switch, a capacitively reactive holding circuit for the magnet in shunt to the start switch, a switch in the holding circuit controlled by the magnet to open and close with the main switch, a reclosing circuit for the magnet connected to the energizing circuit between the start and stop switches, means for maintaining said reclosing circuit open during normal running of the motor, and means for closing said reclosing circuit for a predetermined limited time after failure of voltage in the supply circuit and for then opening said reclosing circuit, provided the voltage does not return to normal during said predetermined time.

4. A time-delay undervoltage control system for a load supplied from a source of alternating current and comprising a normally-open electromagnetic main switch having an operating winding operative when energized to close said main switch for connecting the load to the source and operative when its energization is decreased to a predetermined value to permit opening of said main switch for disconnecting the load from the source, the impedance of said winding being greater when said main switch is closed than when said main switch is open, a normally-open start switch for connecting said main switch winding across the source, normally-open control contacts which open and close with said main switch, a capacitor, means connecting said control contacts and capacitor in series with each other in a holding circuit for said main switch winding around said normally-open start switch when said start switch is opened after said main switch closes, an electromagnetic relay having an operating winding supplied through said holding circuit and having normally-closed contacts connected in parallel with said series connected capacitor and control contacts, said relay winding maintaining said normally-closed contacts open while said main switch is closed, means for deenergizing said main switch winding while maintaining said relay winding energized, the capacitive reactance of said capacitor being greater than the combined inductive reactance of said windings when said windings are in parallel, the drop-out values of said main switch and said relay being so related to each other that upon decrease in the voltage of said source said main switch opens before said relay, the resultant decrease in inductive reactance of said circuit causing a sudden decrease in the current in said main switch winding and in said relay winding, said decrease being sufficient to cause drop-out of said relay and closure of said normally-closed contacts, and means for opening the circuit through said normally-closed contacts a predetermined time after said main switch opens due to said voltage decline.

5. In an alternating current control system, a first electromagnetic device having an armature movable between a picked-up and a dropped-out position and having an operating winding the impedance of which decreases when its associated armature moves from its picked-up to its dropped-out position, a second electromagnetic device having a winding and an armature movable between a picked-up and a dropped-out position, said armatures being movable from their respective picked-up positions to their respective dropped-out positions upon decrease of the current in their respective associated windings below predetermined drop-out values, respectively, said windings being connected in a circuit across a source of alternating voltage of predetermined frequency, capacitor means in said circuit between said source and each of said windings, said capacitor means having a capacitive reactance at said frequency sufficiently greater than the effective inductive reactance of said circuit at said frequency and when said armatures are both in their picked-up positions that the impedance of said circuit increases upon movement of the armature of the first device to its dropped out position consequent upon a decrease of current in said circuit below the drop out value of said first device resulting from a predetermined decrease in the voltage of said source, and the drop out value of said second device being such that upon said increase in the impedance of said circuit, the armature of the second electromagnetic device moves to its dropped out position.

6. The combination with an alternating current electromagnetic device having an operating winding associated with a magnetic circuit which closes when the voltage impressed on said winding is above a predetermined high value and which opens when the voltage impressed on said winding decreases below a predetermined low value, a source of alternating voltage, means for connecting said winding to said source through a first circuit until said magnetic circuit is closed and for subsequently interrupting said first circuit, means rendered operative upon closure of said magnetic circuit to connect said winding to said source through a second circuit and before said first circuit is interrupted, and a capacitor interposed in said circuit in series with said winding and said source and having a capacitive reactance sufficiently greater than the inductive reactance of said winding when said magnetic circuit is closed that the combined reactance of said capacitor and said winding increases when said magnetic circuit opens, of means rendered operative upon opening of said magnetic circuit to connect said winding to said source through a third circuit independently of said second circuit, and means rendered operative a predetermined time after connection of said winding to said source through said third circuit for interrupting said third circuit.

7. The control system of claim 5 characterized in that said windings are connected in parallel with each other.

8. The control system of claim 5 characterized in that the capacitive reactance of the capacitor means is approximately twice the said total effective inductive reactance of said circuit.

9. The control system of claim 5 characterized in that the inductive reactance of the winding of said second device is much greater than that of the winding of the first device.

10. In a control system adapted to be energized by a source of alternating voltage, a pair of electromagnetic devices each having an armature movable between a picked-up and a dropped-out position and each having an operating winding the impedance of which decreases when the associated armature moves from its picked-up to its dropped-out position, each of said armatures being operative to move from its dropped-out to its picked-up position only when the voltage impressed on its associated winding is above a predetermined pick-up voltage value and being operative to move from its picked-up to its dropped-out position only when the voltage impressed on its associated winding is below a predetermined drop-out voltage value less than said pick-up voltage value, a capacitor, an energizing circuit connecting each of said windings in series with said capacitor across said source, and said capacitor having a capacitive reactance sufficiently in excess of the effective inductive reactance of said energizing circuit when said armatures are in their picked-up positions that the change in net reactance of said circuit, upon initial movement of the armature of one of said devices towards its dropped-out position resulting from a decrease in the voltage impressed on its associated winding while both of said windings remain connected in series with said capacitor across said source, causes the voltage across the winding of the other of said devices to decrease below the drop-out voltage value of the other of said devices.

11. In an alternating current control system, a pair of electromagnetic devices each having a winding adapted to be energized at a predetermined normal voltage from a source of alternating current having a predetermined frequency range and each having a magnetic member movable, upon a decrease in the voltage across its associated winding below a predetermined drop-out voltage less than its normal voltage, from a closed to an open position whereby the inductive reactance of its associated winding is reduced, an energizing circuit for, and including, said windings and connected across said source for energizing said windings, a capacitor connected in series with each of said windings across the source, said capacitor having a capacitive reactance, measured at a fixed frequency within said frequency range, sufficiently greater than the total effective inductive reactance of said circuit at said fixed frequency that, if both of said magnetic members of said devices are in their closed positions while both of said windings remain energized from said source and the winding of one of said devices is energized from said source at a voltage less than its drop-out voltage, the decrease in inductive reactance of the winding of said one of said devices, during movement of the magnetic member of said one of said devices from its closed toward its open position, causes a decrease in the voltage across the winding of said other device to a value below the drop-out voltage of said other device.

12. In an alternating current control system, a first electromagnetic device having an armature movable between a picked-up and a dropped-out position and having an operating winding the impedance of which decreases when its associated armature moves from its picked-up to its dropped-out position, a second electromagnetic device having a winding and an armature movable between a picked-up and a dropped-out position, said armatures being movable from their respective picked-up positions to their respective dropped-out positions upon decrease of the current in their respective associated windings below predetermined drop-out values, respectively, a capacitor, said windings being connected in parallel with each other and in series with said capacitor across a source of alternating voltage of predetermined frequency, said capacitor having a capacitive reactance at said frequency sufficiently greater than the effective inductive reactance of said parallel connected windings at said frequency and when said armatures are both in their picked-up positions that the impedance of said circuit increases during movement of the armature of the first device toward its dropped-out position, and the drop-out value of said second device being such that upon said increase in the impedance of said circuit, the armature of the second electromagnetic device moves to its dropped-out position.

13. The control system of claim 1 characterized in that said reclosing control contacts are maintained in open position by an electromagnetic means connected to said source in parallel with said winding and through said reclosing circuit by means of said control contacts, and the pick-up voltage value of said electromagnetic means is less than the pick-up voltage value of said main switch, whereby, upon resumption of normal voltage after said failure, said reclosing control contacts remain closed until said main switch closes and, promptly thereafter, the reclosing contacts open thereby connecting both of said windings in series with said capacitor.

14. In an alternating current control system, a pair of electromagnetic devices having respective magnetic circuits adopted to be closed upon energization of respective operating windings above predetermined pick-up voltage values, said windings being connected in parallel with each other, means connecting one common terminal of said windings to one side of a source of alternating current, a capacitor, means connecting said capacitor between the other common terminals of the said windings and the other side of said source of current, a normally closed contact associated with one of said devices and connected in parallel with said capacitor, said contact being operative to move to its open position upon energization above its pick-up voltage value of the operating winding of said one device and before complete closure of the magnetic circuit of said one device, and the capacitive reactance of said capacitor being sufficiently greater than the effective inductive reactance of said windings that the voltage across the winding of the said one device increases upon opening of said normally closed contact before complete closure of the magnetic circuit of said one device.

References Cited in the file of this patent

UNITED STATES PATENTS

| | | |
|---|---|---|
| 2,149,485 | Wood | Mar. 7, 1939 |
| 2,196,418 | Kintzing | Apr. 9, 1940 |
| 2,386,149 | Smith | Oct. 2, 1945 |
| 2,527,280 | Smith | Oct. 24, 1950 |